(12) United States Patent
Mendez et al.

(10) Patent No.: US 10,758,843 B2
(45) Date of Patent: Sep. 1, 2020

(54) CENTRIFUGAL FLUID SEPARATOR

(71) Applicant: Ford Global Technologies, LLC, Dearborn, MI (US)

(72) Inventors: Mario Alberto Martinez Mendez, Royal Oak, MI (US); Robert Heebner, Southfield, MI (US); Todd Wenzel, Detroit, MI (US); Jacob Powers, Livonia, MI (US); Zun Wang, Novi, MI (US); Yi Zhang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 218 days.

(21) Appl. No.: 15/837,628

(22) Filed: Dec. 11, 2017

(65) Prior Publication Data

US 2019/0176057 A1 Jun. 13, 2019

(51) Int. Cl.

| | |
|---|---|
| *B01D 50/00* | (2006.01) |
| *B01D 19/00* | (2006.01) |
| *H01M 10/613* | (2014.01) |
| *H01M 10/625* | (2014.01) |
| *H01M 10/6568* | (2014.01) |
| *F28F 13/00* | (2006.01) |
| *B04C 5/04* | (2006.01) |

(Continued)

(52) U.S. Cl.
CPC ......... *B01D 19/0057* (2013.01); *B01D 45/12* (2013.01); *B01D 45/16* (2013.01); *B04C 5/04* (2013.01); *B04C 5/081* (2013.01); *B60L 58/26* (2019.02); *F28F 13/00* (2013.01); *H01M 10/613* (2015.04); *H01M 10/625* (2015.04); *H01M 10/6568* (2015.04); *A47L 9/1608* (2013.01); *B04C 5/13* (2013.01); *F28F 2265/18* (2013.01); *H01M 2220/20* (2013.01)

(58) Field of Classification Search
CPC .... B01D 45/16; B01D 45/12; B01D 19/0057; B04C 5/04; B04C 5/13; B04C 5/081; A47L 9/1608; B60L 58/26; F28F 13/00; F28F 2265/18; H01M 10/6568; H01M 10/625; H01M 10/613; H01M 2220/20
See application file for complete search history.

(56) References Cited

U.S. PATENT DOCUMENTS 2,796,147 A * 6/1957 Henri ................. B04C 5/12 55/455
2,874,801 A * 2/1959 Der Kolk ............ B04C 5/28 55/348

(Continued)

FOREIGN PATENT DOCUMENTS

FR 2841187 A1 12/2003

*Primary Examiner* — Dung H Bui
(74) *Attorney, Agent, or Firm* — David Kelley; Brooks Kushman, P.C.

(57) ABSTRACT

A vehicle system is provided. The system may include a first coolant loop, including a radiator, a second coolant loop including a battery chiller, and a centrifugal coolant separator. The centrifugal coolant separator may include a frustoconical hollow body having a base defining a drain and a ceiling defining a spout, and a pair of coolant lines arranged orthogonal to and on opposite sides of the body such that coolant exiting the lines travels along the inner surface and collects at the base to separate gas from the coolant, wherein the spout vents the gas and the coolant exits the drain.

13 Claims, 3 Drawing Sheets

(51) Int. Cl.
 *B60L 58/26* (2019.01)
 *B04C 5/081* (2006.01)
 *B01D 45/16* (2006.01)
 *B01D 45/12* (2006.01)
 *B04C 5/13* (2006.01)
 *A47L 9/16* (2006.01)

(56) References Cited

U.S. PATENT DOCUMENTS

| | | | | |
|---|---|---|---|---|
| 3,358,844 A * | 12/1967 | Klein | ............. | B04C 3/00 |
| | | | | 210/512.1 |
| 3,720,314 A * | 3/1973 | Phillippi | ............. | B04C 3/00 |
| | | | | 209/139.2 |
| 3,848,550 A * | 11/1974 | Bowen | ............. | B01D 45/12 |
| | | | | 110/244 |
| 4,278,550 A | 7/1981 | Watts | | |
| 4,456,456 A * | 6/1984 | Pompei | ............. | B01D 19/0068 |
| | | | | 237/63 |
| 4,770,626 A * | 9/1988 | Zinn | ............. | B01J 19/10 |
| | | | | 122/24 |
| 4,820,414 A * | 4/1989 | Carroll | ............. | B01D 17/0217 |
| | | | | 209/731 |
| 6,440,317 B1 * | 8/2002 | Koethe | ............. | B01D 17/0217 |
| | | | | 210/774 |
| 7,819,953 B2 | 10/2010 | Andersson | | |
| 8,512,451 B1 * | 8/2013 | Heumann | ............. | B04C 5/04 |
| | | | | 55/348 |
| 8,657,932 B2 * | 2/2014 | Huziwara | ............. | B04C 3/06 |
| | | | | 95/271 |
| 8,945,264 B2 * | 2/2015 | Craig | ............. | B04C 5/04 |
| | | | | 55/459.1 |
| 9,050,897 B1 * | 6/2015 | Collins | ............. | H02P 3/14 |
| 10,399,022 B2 * | 9/2019 | Palmas | ............. | B01D 45/02 |
| 2003/0163887 A1 * | 9/2003 | Inoue | ............. | A47L 5/28 |
| | | | | 15/353 |
| 2007/0289269 A1 * | 12/2007 | Oh | ............. | A47L 9/1608 |
| | | | | 55/459.1 |
| 2009/0197753 A1 * | 8/2009 | Lajtonyi | ............. | B04C 5/04 |
| | | | | 494/42 |
| 2016/0084145 A1 * | 3/2016 | Fulton | ............. | F04D 15/0022 |
| | | | | 415/118 |
| 2016/0200175 A1 * | 7/2016 | Nakajima | ............. | F25B 5/02 |
| | | | | 62/500 |
| 2016/0208678 A1 | 7/2016 | Zhang et al. | | |
| 2017/0063275 A1 * | 3/2017 | Park | ............. | F25B 49/025 |

* cited by examiner

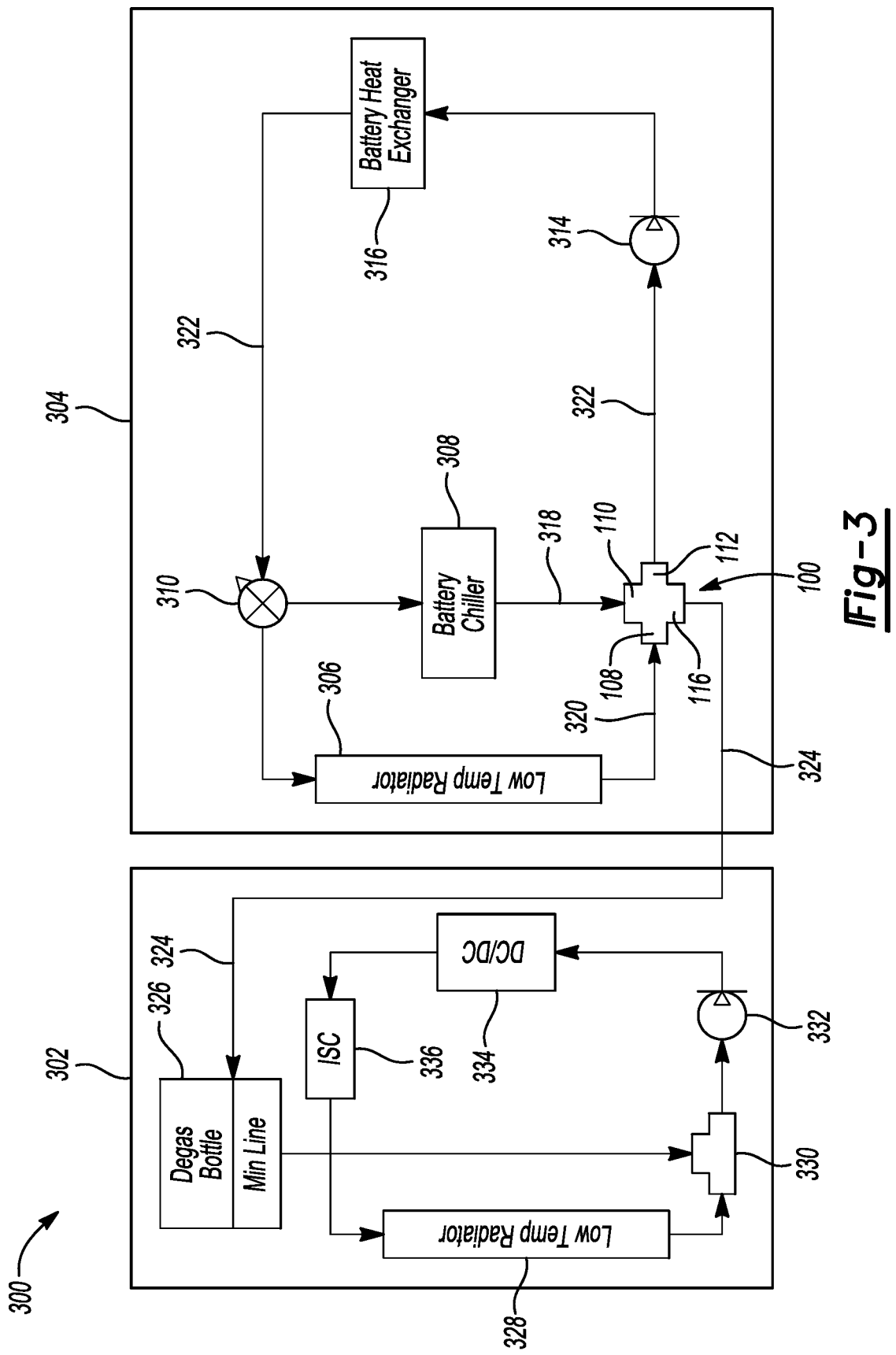

CENTRIFUGAL FLUID SEPARATOR

TECHNICAL FIELD

The present disclosure relates to a liquid separation device, particularly for removing air or other gases from a vehicle thermal management system.

BACKGROUND

Various systems may require two or more liquids to be separated from one another. The fluid may have various phases, e.g., gas or liquid, and vary in terms of specific gravity and density. As one example, most internal combustion engines within are fluid cooled using either air (a gaseous fluid) or a liquid coolant run through a heat exchanger (radiator) that is cooled by air. As another example, electric vehicles or hybrid-electric vehicles may include a battery and associated electronic components that are fluid cooled in a similar manner.

Hybrid-electric and electric vehicles may include one or more fluid cooling systems to regulate the temperature of various components. For example, one system or "loop" may be used to cool a high-voltage battery and another may cool electric components. These two systems may be fluidly connected to one another to minimize the amount of fluid and components required to cool the electric components and the battery. As the distance the fluid travels increases, the propensity of air within the cooling system increases. Air has relatively poor thermal conductivity compared to liquid coolants, so the presence of air within a coolant system results in a decrease in efficiency.

SUMMARY

According to a first embodiment of this disclosure, a vehicle system is provided. The system may include a first coolant loop, a second coolant loop, and a centrifugal coolant separator. The first coolant loop may include a radiator and the second coolant loop may include a battery chiller. The centrifugal coolant separator may include a frustoconical hollow body including a base, that defines a drain and a ceiling that defines a spout. The separator may include a pair of coolant lines arranged orthogonally to an axis defined by the body and on opposite sides of the body. The arrangement of the coolant lines causes the coolant to travel along the inner surface of the body until the coolant collects at the base so the gas is separated from the coolant. The spout may vent the gas and the drain facilitates the removal of the coolant from the separator.

According to another embodiment of this disclosure, a centrifugal fluid separator is provided. The separator may include a frustoconical hollow body having a base defining a drain and a ceiling defining a spout. The separator may further include a pair of coolant inlets arranged tangentially to an inner surface of and on opposite sides of the body. The inlets may be arranged such that coolant entering the inlets travels along the inner surface and collects at the base. As the base collects the coolant, gas may be separated from the coolant. The coolant may exit the drain and the gas may exit the spout.

According to yet another embodiment of this disclosure a vehicle coolant system is provided. The system may include a frustoconical body having a base defining a drain and a ceiling defining a spout. First and second coolant lines may be arranged orthogonally to an inner surface of the body so that coolant entering the inlets travels along the inner surface and collects at the base the separate gas from the coolant. The spout may vent gas and the drain may drain the coolant.

BRIEF DESCRIPTION OF THE DRAWINGS

FIG. 3 is a schematic diagram of an example coolant system for a battery-hybrid-electric vehicle (BHEV).

DETAILED DESCRIPTION

Figure 1:
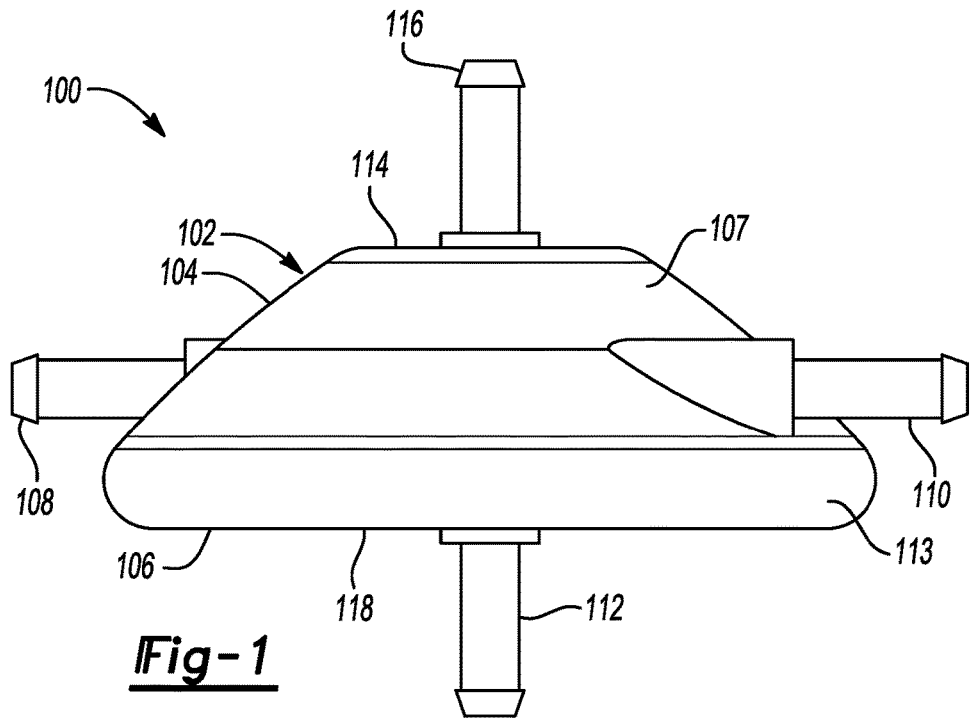
FIG. 1 is a plan view of an example fluid separator.

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of particular components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Automotive vehicles generally include a thermal management system to control the temperature of an internal combustion engine, a battery, etc. A thermal management system for hybrid vehicles and electrical vehicles may include two or more coolant loops; one to cool a high-voltage (H.V.) battery (battery coolant loop) and another (electronics coolant loop) for associated components, e.g., transformers, inverters, and controllers. In some instances, the electronics coolant loop and battery coolant loop are interconnected by a coolant line. As the length of the coolant line connecting the electronics coolant loop and battery coolant loop increases, so does the risk of air accumulating within the lines. Trapped air within a coolant line may decrease the efficiency of the thermal management system.

A centrifugal coolant separator may be used to separate the trapped air from the coolant. The separator includes a frustoconical hollow body having a base that defines a drain and a ceiling that defines a spout. The separator may also include a pair of coolant lines that are arranged orthogonally to an axis of the body. Orthogonally or orthogonal mean perpendicular or approximately perpendicular (~90°). Coolant may flow from the radiator within the electronics coolant loop and from the battery heat exchanger of the battery coolant loop so that it exits the coolant lines. The coolant travels along the inner surface of the body and collects at the base to separate gas from the coolant. The spout may vent the gas and the collected coolant exits the drain.

The battery coolant loop may include a battery chiller, a battery heat exchanger, or both. The electronics coolant loop may include a radiator or other heat exchanging device. The drain of the separator may be fluidly connected to the battery heat exchanger, battery chiller, or radiator so the collected fluid returns to either loop. The spout may be fluidly connected to a degas bottle that collects trapped air from the system.

Figure 2:
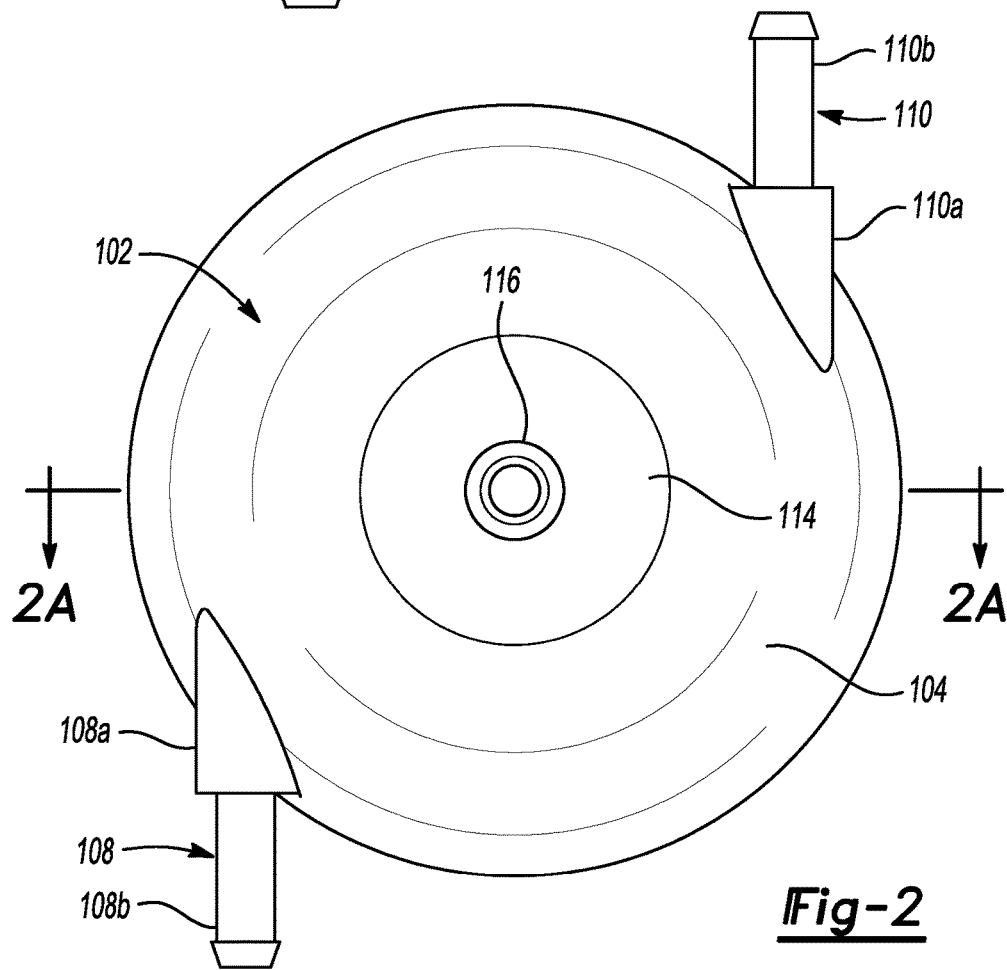
FIG. 2 is a top view of an example fluid separator.

Now referring to FIGS. 1 and 2, a plan view and a top view of a centrifugal fluid separator 100 is illustrated. The fluid separator includes a frustoconical hollow body 102 that may include an upper portion 104 and a lower portion 106. Alternatively, the fluid separator may be formed as a single or unitary piece. The frustoconical hollow body 102 of the separator 100 includes a sidewall 107 that extends from a top surface or ceiling 114 to a curved edge portion 113. The curved edge portion 113 extends from a base or bottom surface 118.

The term frustoconical is derived from the term frustum, a cone formed by cutting off the top by a plane that is substantially parallel to the base. Naturally, the frustoconical body is tapered; the curved edge portion 113 defines a diameter that is greater than the diameter defined by the ceiling 114. Segments of the body 102 decrease in diameter between the curved edge portion 113 and the ceiling. The wider lower portion of the hollow body 102 facilitates the accumulation of the coolant and the narrower upper portion facilitates the accumulation of gas, that is less dense than the coolant. The collected coolant has a higher density and is more prevalent than gas separated from the coolant, thus a larger volume is required for collecting the coolant as opposed to the gas.

Two inlet pieces 108 and 110 outwardly extend from the sidewall 104 of the hollow body 102. The inlet pieces are arranged orthogonally to the spout 116 that extends from the top surface 114. The inlet pieces 108 and 110 may also be arranged orthogonally to a drain 112 that extends from the bottom surface 118. The first inlet 108 may include a proximal end 108a that extends from the sidewall 107 to a distal end 108b. Similarly, the second inlet 110, disposed on a side opposite of the first inlet 108, may include a proximal end 110a that extends from the sidewall 107 to a distal end 108b. The proximal ends 108a and 110a may have a circular shape and define a diameter that is greater than a diameter defined by the distal ends 108b and 110b.

The inlets 108 and 110 may be connected to a hose or a pipe that carries coolant. The coolant may be received from a battery chiller, radiator, or some other heat exchanger device. Similarly, the drain 112 and spout 116 may be attached to a hose or pipe that carries a fluid, such as air or a coolant. The inlets 108 110, drain 112, and spout 116 may each have tapered distal ends that are configured to be received by a quick clamp hose connection or some other suitable connection.

Figure 2A:
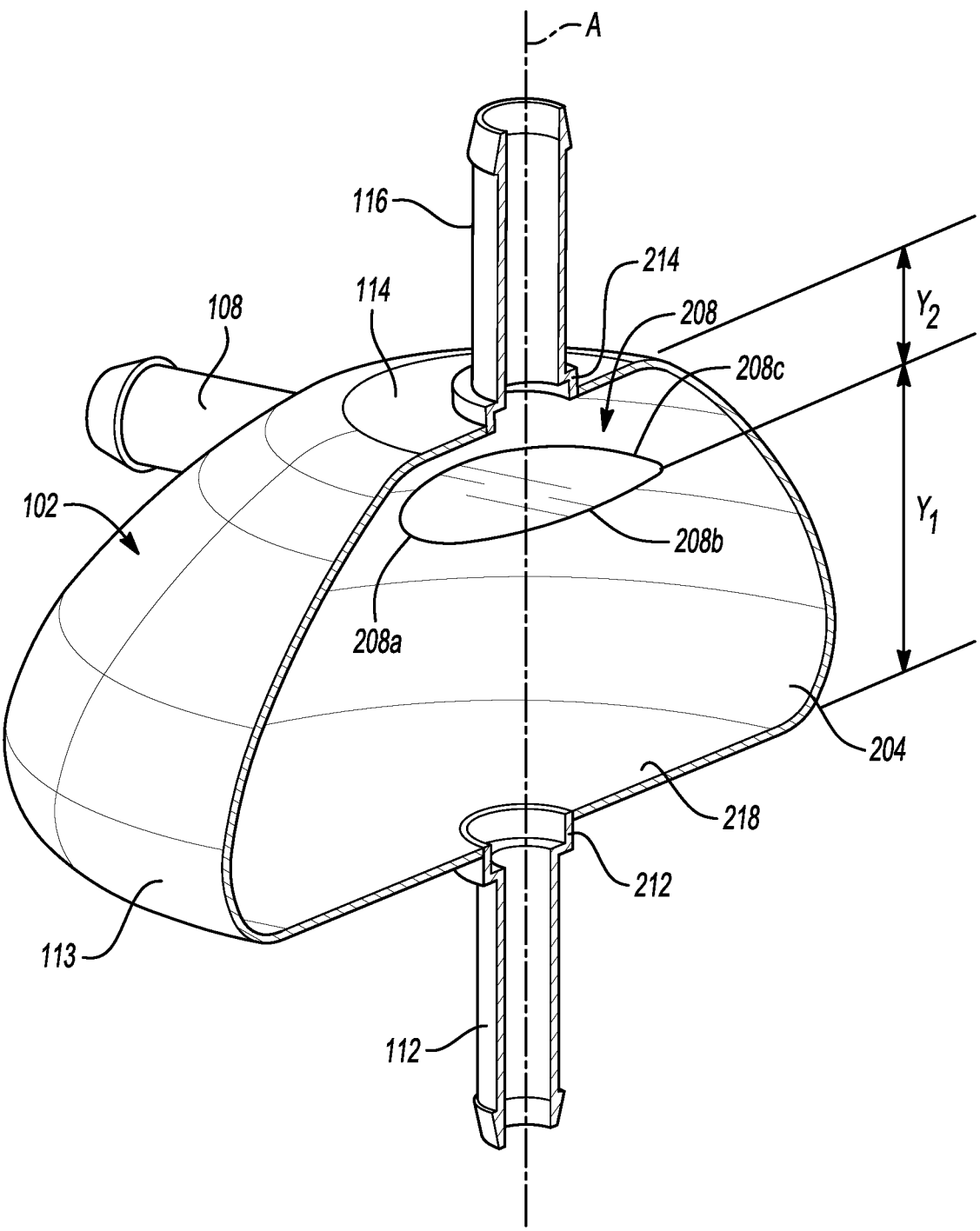
FIG. 2A is a cross-sectional view of the fluid separator illustrated in FIG. 2.

Now referring to FIG. 2A, a cross-sectional view of the centrifugal fluid separator 100 is illustrated. The frustoconical body 102 includes an inner wall 204 that extends between the inner surface 218 of the base 118 and the ceiling 114. As was previously mentioned, the inlets 108 and 110 define a circular diameter that is tangential to the inner wall 204 of the body 102. Because the inlets are tangential to the inner wall 204, the opening 208 defined by the inner wall is non-circular or ellipsoidal. The opening 208 may include a first end 208a, a middle portion 208b, and a second end portion 208c. The first end 208a may define a radius that is less than the radius defined by the second end portion 208c. But in other embodiments, the first end 208a may define a radius that is less than the second end portion 208c. The middle portion 208b may include upper and lower segments positioned between the x's, that each define a radius that is less than radii defined by the first end 208a and second end 208c, respectively. Because FIG. 2A is a cross-sectional view, only one inlet 108 and opening 208 is illustrated. So the description of the inlet 108 and opening 208 described above and below applies to the inlet 110 and opening 210 that is not shown.

The opening 208 is spaced away from the bottom surface 218 by a distance $Y_1$ and a distance $Y_2$ from the ceiling 114. Because the distance $Y_1$ is greater than the distance $Y_2$, the opening 208 is positioned in the upper portion of the hollow body 102. As coolant and trapped air, if present, flows through the coolant inlet 108 it first enters the hollow body 102 near the first end 208a of the opening 208, it then continues its path along the middle portion 208b to the end portion 208c, and along the inner wall 204. Because the opening is positioned in the upper portion of the hollow body 102 the coolant inertially flows along the upper portion of the inner wall 204. Centrifugal force, an apparent force that acts outward on a body (coolant) that moves around a center (axis A) forces the coolant to away from the axis A towards the inner wall 204. As the coolant travels along the upper portion of the inner wall 204, gravity draws the denser fluid coolant towards the bottom surface 218. The coolant may enter the opening 208 from the coolant inlet 108 at a flow velocity of $v_1$. As the coolant enters the more voluminous hollow body 102, the fluid pressure of the coolant decreases and the flow velocity begins to decrease to $v_2$. The decrease in flow velocity and the centrifugal forces of the coolant facilitates the separation of trapped gas from the coolant.

Now referring to FIG. 3, a schematic of a vehicle thermal management system 300 is illustrated. The thermal management system 300 may include an engine loop 302 and a battery loop 304 connected to one another. The battery loop 304 may be disposed beneath or within a luggage compartment (rear trunk) and the engine loop 302 may be disposed within an engine compartment. The battery coolant loop 304 includes the centrifugal fluid separator 100 that receives coolant from a battery loop low temperature radiator 306 and a battery chiller 308. The low temperature radiator may receive coolant from a directional pump 310 by a coolant line 322. Similarly, the battery chiller 308 may also receive coolant from the directional pump 310. Coolant lines 318 and 320 provide coolant to the coolant inlets 108 and 110 of the separator 100. The frustoconical body 102 of the separator 100 alters the direction of the coolant so that the flow velocity is reduced and the coolant is directed away from the center towards the inner wall 204 so that gas is separated from the coolant.

The coolant separated from the gas exits from the drain 112 of the separator 100 through line 322. The separated coolant is then provided to a pump 314 that pumps the fluid to the battery-heat exchanger 316. The battery heat exchanger provides the coolant received from the pump 314 to a directional pump 310. The directional pump 310 may direct flow to the battery chiller 308 or the low temperature radiator 306, or both.

The separated gas accumulates near and expels from the spout 116 through line 324 to a degas bottle 326. While a degas bottle is illustrated, a simple container may be utilized. The degas bottle 326 is disposed the engine loop 302, though in other embodiments, the degas bottle may be disposed within the battery loop 304. The degas bottle may be connected to the three-way fluid connector 330 that is in turn connected to a pump 332. The pump 332, a DC/DC voltage transformer 334, an inverter system controller (ISC) 336, and a low temperature radiator 328 form a circuit coolant path, connected by a three-way fluid connector 330. The DC/DC voltage transformer 334 may convert high-voltage current into low-voltage current before providing the current to a low-voltage battery (not illustrated). The ISC 336 may be a three-phase AC inverter that provides power to an electric motor (not illustrated).

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle system comprising:
   a first coolant loop including a radiator;
   a second coolant loop including a battery chiller; and
   a centrifugal coolant separator including:
      a frustoconical hollow body having a base defining a drain and a ceiling defining a spout, and
      a pair of coolant lines associated with the loops and arranged on opposite sides of the body such that coolant exiting the lines travels along an inner surface of the body and collects at the base for exit via the drain to separate gas from the coolant for venting via the spout.

2. The vehicle system of claim 1 further comprising a battery heat exchanger fluidly connected to the battery chiller and configured to receive coolant from the drain and provide coolant to the battery chiller.

3. The vehicle system of claim 1 further comprising a degas bottle configured to receive gas from the spout.

4. The vehicle system of claim 1, wherein the pair of coolant lines are tangentially arranged to the inner surface.

5. The vehicle system of claim 1, wherein the first coolant loop is disposed within a front-engine compartment and wherein the second coolant loop is disposed beneath a rear-trunk compartment.

6. The vehicle system of claim 1, wherein the frustoconical hollow body includes a curved corner portion circumferentially extending around the base and extending between the base and a sidewall defining the inner surface.

7. A vehicle coolant system comprising:
   a frustoconical hollow body having a base defining a drain and a ceiling defining a spout; and
   a pair of coolant inlets arranged tangentially to an inner surface of the body such that coolant entering the inlets travels along the inner surface and collects at the base to separate gas from the coolant, wherein the pair of coolant inlets are connected to coolant lines within a battery coolant loop including a battery chiller that provides coolant to one of the coolant inlets, wherein the spout vents the gas and the coolant exits the drain.

8. The vehicle coolant system of claim 7, wherein the frustoconical hollow body includes a curved corner portion circumferentially extending around the base and extending between the base and a sidewall defining the inner surface.

9. The vehicle coolant system of claim 7, wherein the pair of coolant inlets are spaced away from the ceiling by a first distance and spaced away from the drain by a second distance less than the first distance such that a space within the body, extending along the first distance, accommodates the gas.

10. The vehicle coolant system of claim 9, further comprising a pump disposed between the drain and battery chiller configured to move coolant from the drain to the battery chiller.

11. The vehicle coolant system of claim 7, further comprising a radiator fluidly connected to the battery chiller and the other of the coolant inlets.

12. The vehicle coolant system of claim 7, further comprising an electronics coolant loop including a degas bottle fluidly connected to the spout.

13. The vehicle coolant system of claim 12, further comprising a radiator fluidly connected to an inverter system controller configured to provide coolant to one of the coolant inlets.

* * * * *